United States Patent
Zingler (10) Patent No.: US 9,686,729 B2
(45) Date of Patent: Jun. 20, 2017

(54) METHOD, NETWORK AND SYSTEM FOR AN IMPROVED OPERATION OF A CELLULAR TELECOMMUNICATIONS NETWORK IN AN EDGE REGION OF THE RADIO COVERAGE AREA

(71) Applicant: Deutsche Telekom AG, Bonn (DE)

(72) Inventor: Olaf Zingler, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/035,766

(22) PCT Filed: Nov. 11, 2014

(86) PCT No.: PCT/EP2014/074284
§ 371 (c)(1),
(2) Date: May 11, 2016

(87) PCT Pub. No.: WO2015/071267
PCT Pub. Date: May 21, 2015

(65) Prior Publication Data
US 2016/0286456 A1   Sep. 29, 2016

(30) Foreign Application Priority Data

Nov. 15, 2013  (EP) .................................. 13193142

(51) Int. Cl.
*H04W 36/32* (2009.01)
*H04W 84/04* (2009.01)
(Continued)

(52) U.S. Cl.
CPC ....... *H04W 36/32* (2013.01); *H04W 36/0061* (2013.01); *H04W 36/0066* (2013.01);
(Continued)

(58) Field of Classification Search
CPC ... H04W 36/32; H04W 64/003; H04W 36/30; H04W 36/0066; H04W 36/0072;
(Continued)

(56) References Cited

U.S. PATENT DOCUMENTS 8,107,955 B2 * 1/2012 Islam .................... H04W 48/16
370/331
2010/0074235 A1   3/2010 Sebire et al.
(Continued)

FOREIGN PATENT DOCUMENTS

EP   2110990 A1   10/2009
EP   2213128 B1    8/2010

OTHER PUBLICATIONS

Vodafone: "Country Border Issue in EUTRAN", 3GPP Draft; R2_082321_Country_Border_Issue_LTE, $3^{RD}$ Generation Partnership Project (3GPP), Mobile Competence Centre; 650, Route Des Lucioles; F-06921 Sophia-Antipolis Cedex; France, vol. RAN WG2, no. Kansas City, USA; 20080428, Apr. 28, 2008 (Apr. 28, 2008), XP050140459, 1 introduction 2 Cell Identification in Country Border Region figure 1.

*Primary Examiner* — Sharad Rampuria
(74) *Attorney, Agent, or Firm* — Leydig, Voit & Mayer, Ltd.

(57) ABSTRACT

A method for operation of a cellular telecommunications network in an edge region of the radio coverage area of the cellular telecommunications network includes: in a first step, a user equipment receives from the further base station entity information comprising the specific cell identifier, wherein the specific cell identifier as well as additional information related to the further base station entity are transmitted by the user equipment to the serving base station entity; and in a second step, subsequent to the first step, the user equipment, upon reception from the further base station entity of identifier information comprising the specific cell
(Continued)

identifier, and based on blacklist information received by the user equipment referring at least to the specific cell identifier, avoids transmitting additional information regarding the further base station entity to the serving base station entity and/or avoids consideration of the further base station entity in a cell-reselection procedure.

12 Claims, 1 Drawing Sheet

(51) Int. Cl.
    *H04W 24/02*     (2009.01)
    *H04W 36/00*     (2009.01)
    *H04W 36/30*     (2009.01)
    *H04W 64/00*     (2009.01)
    *H04W 24/10*     (2009.01)

(52) U.S. Cl.
    CPC ... *H04W 36/0072* (2013.01); *H04W 36/0083* (2013.01); *H04W 36/30* (2013.01); *H04W 64/003* (2013.01); *H04W 24/02* (2013.01); *H04W 24/10* (2013.01); *H04W 84/042* (2013.01)

(58) Field of Classification Search
    CPC ......... H04W 36/0061; H04W 36/0083; H04W 84/042; H04W 24/10; H04W 24/02
    USPC .................................................. 455/434–438
    See application file for complete search history.

(56) References Cited

U.S. PATENT DOCUMENTS

| | | | |
|---|---|---|---|
| 2010/0248722 A1 | 9/2010 | Van Bussel et al. | |
| 2011/0171915 A1* | 7/2011 | Gomes .................. | H04W 24/10 455/73 |
| 2012/0135731 A1* | 5/2012 | Rangaiah .............. | H04W 48/20 455/434 |
| 2013/0170362 A1 | 7/2013 | Futaki et al. | |
| 2013/0182583 A1* | 7/2013 | Siomina ................ | H04W 24/10 370/252 |
| 2014/0112243 A1* | 4/2014 | Suzuki .................. | H04W 56/00 370/328 |
| 2015/0038140 A1* | 2/2015 | Kilpatrick, II ........ | H04W 64/00 455/436 |
| 2015/0195758 A1* | 7/2015 | Kim ...................... | H04W 24/10 370/252 |
| 2015/0312805 A1* | 10/2015 | Cui ................... | H04W 36/0083 370/331 |

\* cited by examiner

METHOD, NETWORK AND SYSTEM FOR AN IMPROVED OPERATION OF A CELLULAR TELECOMMUNICATIONS NETWORK IN AN EDGE REGION OF THE RADIO COVERAGE AREA

CROSS-REFERENCE TO RELATED APPLICATIONS

This application is a U.S. National Phase application under 35 U.S.C. 0371 of International Application No. PCT/EP2014/074284, filed on Nov. 11, 2014, and claims benefit to European Patent Application No. EP 13193142.0, filed on Nov. 15, 2013. The International Application was published in English on May 21, 2015 as WO 2015/071267 A1 under PCT Article 21(2).

FIELD

The present invention relates inter alia to a method for an improved operation of a cellular telecommunications network in an edge region of the radio coverage area of the cellular telecommunications network, wherein a user equipment is located in a radio cell being located in the edge region of the radio coverage area, wherein the user equipment—besides receiving radio signals from the serving base station entity—receives radio signals also from a further base station entity of a further cellular telecommunications network.

Furthermore, the present invention relates to a cellular telecommunications network, especially a public land mobile network, provided for an improved operation in an edge region of the radio coverage area of the cellular telecommunications network, wherein a user equipment is located in a radio cell being located in the edge region of the radio coverage area, wherein the user equipment—besides receiving radio signals from the serving base station entity—receives radio signals also from a further base station entity of a further cellular telecommunications network.

Additionally, the present invention relates to a system for an improved operation in an edge region of the radio coverage area of the cellular telecommunications network, wherein the system comprises the cellular telecommunications network and a user equipment, wherein the user equipment is located in a radio cell being located in the edge region of the radio coverage area, wherein the user equipment—besides receiving radio signals from the serving base station entity—receives radio signals also from a further base station entity of a further cellular telecommunications network.

BACKGROUND

With presently known LTE (Long Term Evolution) cellular telecommunications networks—especially when channel centre frequencies are aligned and/or frequency channels have overlapping bandwidth—typically there exist interference problems, especially in edge regions of cellular telecommunications networks, i.e. in the region of overlap of two cellular telecommunications networks that are adjacent to each other. This typically occurs at the edge region of the radio coverage area of cellular telecommunications networks in the vicinity of a territorial border, e.g. between different countries.

Therefore, radio frequency cells and sites of such cellular telecommunications networks of a mobile network operator have to pass several approval-processes, typically of the national regulatory authority, such as, e.g. in Germany, Bundesnetzagentur BNetzA. One of such requirements that the cellular telecommunications network has to fulfill is that the radio transmissions of a radio frequency mobile network cell need to be checked in order to assure that such transmissions do not cover areas of the adjacent geographical area (typically a foreign country) such that predefined field-strength thresholds are exceeded.

Typically, this check is based, e.g., on the HCM-agreement, defined by 17 neighboured European countries. In the context of the HCM-agreement, a common prediction model is used—the so-called Harmonised Calculation Method (HCM)—which is used to predict the field-strength of a radio cell at different distances from the border line, such as, e.g., 0 km (from the border line, i.e. on the border) or 6 km (from the border line in the respective adjacent country). If the predicted thresholds are not violated or exceeded, it is assumed that no interference is generated within the respective other cellular telecommunications network (i.e. the cellular telecommunications network of the foreign country) and the considered radio cell is allowed to be permanently emitting (or being active or "on air").

However, as the HCM-agreement aims at avoiding situations of interference, the application of the HCM-agreement and the respective field strengths has the consequence that often the edge region of the radio coverage area of the cellular telecommunications network, i.e. typically the area of the border between two countries, is not sufficient covered with respect to LTE service.

Moreover, the prediction model according to the HCM-agreement is a mathematical model and does not perfectly fit real situations in practice. Wherever real interference situation appears, especially in cases where no mobility between the mobile operators is agreed and configured (e.g. as a part of a local limited network sharing according to document EP 2 213 128 B1), performance degradations will probably appear.

These degradations are extremely strong in case that the same or similar downlink centre frequency and physical cell identifier (PCI) are used in cells that belong to different cellular telecommunications networks but are adjacent along respective edge regions of the cellular telecommunications networks (typically along the territorial border between countries). As a solution to this problem, e.g., the ECC (Electronic Communications Committee within the European Conference of Postal and Telecommunications Administrations) recommends (cf. document "ECC Recommendation04") a coordination of physical cell identifiers between the different cellular telecommunications networks along a territorial border if they operate their mobile telecommunication networks with the same or similar downlink centre frequencies.

Additionally, the 3GPP standardization offers options to blacklist physical cell identifiers for the purpose of measurements needed for idle mode procedures (namely cell-re-/selection as defined for LTE intra-frequency and LTE inter-frequency in 3GPP TS 136.331) and active mode procedures, e.g. for IntraLTE mobility, in a serving cell. Within the context of an overlapping mobile network with a foreign network operator, with the same used LTE centre frequencies, with the blacklisting of physical cell identifiers it can be achieved to avoid unnecessary user equipment measurements for the purpose of cell-reselection (idle mode procedure) and/or event and/or periodic reports of cells (i.e. physical cell identifiers with their received field strengths and/or measured quality) of the foreign network operator, i.e. of the cellular telecommunications network on the other side of the territorial border considered.

Typically, interference relations between a pair of cells are not symmetrical in downlink, i.e. a first radio cell can strongly interfere with a second radio cell but this does not necessarily mean that the second radio cell strongly interferes with the first radio cell). The consequence is that currently, there is no set of rules available how exactly define physical cell identifier blacklist entries in the different radio cells (i.e. for the definition of where to set the physical cell identifier blacklist entries into the serving cells of the own cellular telecommunications network. Often, an exchange of network configuration data between mobile operators operating adjacent cellular telecommunications networks—e.g. to calculate, based on a prediction, the interference relations between adjacent cells of different cellular telecommunications networks—is not possible or not desired.

Beside the HCM-agreement, there might be additional agreements of national authorities, e.g. allowing increased thresholds of field strengths in order to increase the coverage probability along the territorial border. Typically, these bilateral agreements of the national authorities further authorize the mobile network operators to agreed additional operator-specific agreements.

However, currently a sufficient LTE-coverage near the territorial border or in the edge region of the radio coverage area of the cellular telecommunications network is quite hard to achieve and is in several cases limited through theoretical frequency co-ordination models, as HCM in Germany and other European countries. There are at least two kind of weaknesses, namely an under-prediction or an over-prediction at the different distances from the border (i.e. x km distances of, e.g. 0 km or 6 km from the borderline), which leads to either too less LTE coverage in reality or to a real interference situation between adjacent radio cells of the different cellular telecommunications networks even that this was not predicted by the used prediction model.

Especially the second case involves a lot of effort, as the detection of the reason of this interference has to be typically found out by expensive drive tests, e.g. a special car with a radiofrequency scanner and signalling decoder. The first case (lack of real LTE-coverage) can often not be finally solved, because of the used underlying theoretical prediction model within the official approval process of the respective national regulatory authority.

SUMMARY

In an embodiment, the invention provides a method for operation of a cellular telecommunications network in an edge region of the radio coverage area of the cellular telecommunications network. The cellular telecommunications network comprises an access network, wherein a user equipment is located in a radio cell of the access network, the radio cell being located in the edge region of the radio coverage area of the cellular telecommunications network and the radio cell being served by a serving base station entity. The user equipment receives radio signals from the serving base station entity and a further base station entity of a further cellular telecommunications network. A specific cell identifier is assigned to the further base station entity. The serving base station entity transmits blacklist information regarding cell identifiers to the user equipment, the blacklist information referring to cell identifiers for which measurements to be conducted by the user equipment of the radio environment at the position of the user equipment are to be avoided. The method includes the following steps: in a first step, the user equipment receives, from the further base station entity, information comprising the specific cell identifier, wherein the specific cell identifier as well as additional information related to the further base station entity are transmitted by the user equipment to the serving base station entity; and in a second step, subsequent to the first step, the user equipment, upon reception from the further base station entity of identifier information comprising the specific cell identifier, and based on blacklist information received by the user equipment referring at least to the specific cell identifier, avoids transmitting additional information regarding the further base station entity to the serving base station entity and/or avoids consideration of the further base station entity in a cell-reselection procedure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the invention provides a method for an improved operation of a cellular telecommunications network in an edge region of the radio coverage area of the cellular telecommunications network such that ideally both insufficient or suboptimal LTE coverage in the edge region and situations of increased interference of adjacent radio cells (of other, adjacent cellular telecommunications networks of the same radio access technology, i.e. LTE, or of another radio access technology such as 2G or 3G (UMTS, Universal Mobile Telecommunications System)) can be easily and effectively detected and ideally the network operation parameters modified such that such situations of both insufficient or suboptimal LTE coverage (or coverage of another radio access technology) and of increased interference of adjacent radio cells can be reduced and thus costs (like capital expenditure (CAPEX) and operational expenditure (OPEX)) be reduced, and the revenue as well as the service level of a user of the cellular telecommunications network increased.

In an embodiment, the invention provides a method for an improved operation of a cellular telecommunications network in an edge region of the radio coverage area of the cellular telecommunications network, wherein the cellular telecommunications network comprises an access network, wherein a user equipment is located in a radio cell of the access network, the radio cell being located in the edge region of the radio coverage area of the cellular telecommunications network and the radio cell being served by a serving base station entity, wherein the user equipment—besides receiving radio signals from the serving base station entity—receives radio signals also from a further base station entity of a further cellular telecommunications network, wherein a specific cell identifier, especially a specific physical cell identifier (as used in LTE) and/or a specific primary scrambling code (as used in 3G to enable the user equipments to distinguish between different 3G radio cells), is assigned to the further base station entity, wherein the serving base station entity transmits a blacklist information regarding cell identifiers, especially specific physical cell identifiers and/or specific primary scrambling codes, to the user equipment, the blacklist information referring to cell identifiers, especially physical cell identifiers and/or primary scrambling codes, for which measurements—to be conducted by the user equipment—of the radio environment at the position of the user equipment are to be avoided, wherein the method comprises the following steps:

in a first step, a first blacklist information—received by the user equipment—refers at most to other cell identifiers than the specific cell identifier, especially at most to other physical cell identifiers than the specific physical cell identifier or at most to other primary scrambling codes than the specific primary scrambling code, or the blacklist information is not transmitted at all (which means that no blacklisted cell identifier, especially a physical cell identifier or a primary scrambling code, is transmitted at all), and the user equipment receives— from the further base station entity—an information comprising the specific cell identifier, especially the specific physical cell identifier or the specific primary scrambling code, wherein the specific cell identifier, especially the specific physical cell identifier or the specific primary scrambling code, as well as additional information related to the further base station entity are transmitted by the user equipment to the serving base station entity, in a second step, subsequent to the first step, a second blacklist information—received by the user equipment—refers at least to the specific cell identifier, especially the specific physical cell identifier or the specific primary scrambling code, and the user equipment, upon reception from the further base station entity of an identifier information comprising the specific cell identifier, especially the specific physical cell identifier or specific primary scrambling code, avoids transmitting additional information regarding the further base station entity to the serving base station entity and/or avoids a consideration of the further base station entity in the cell-reselection procedure.

According to the present invention it is thereby advantageously possible, that the cell individual (LTE) cell identifier blacklist settings, i.e. the cell identifier blacklist to be applied by a radio cell, as well as the antenna parameters and power settings of LTE radio cells located in the vicinity of the territorial border, i.e. in the edge region of the considered cellular telecommunications network, are optimized based on mobile measurements within the LTE radio cells of the edge region of the cellular telecommunications network and within the UMTS and/or LTE radio cells of the further cellular telecommunications network (i.e. across the border).

Especially, the following variants of the cell identifier blacklist settings are possible according to the present invention:

separate cell identifier blacklist settings (i.e. the first blacklist information and/or the second blacklist information) refer to the active (or connected) mode of the user equipment and in view of target LTE radio cells (i.e. the further base station entities being LTE base station entities), separate cell identifier blacklist settings (i.e. a first variant of the first blacklist information and/or a first variant of the second blacklist information) refer to the idle mode of the user equipment (listening to the serving base station entity) and in view of target LTE radio cells (i.e. the further base station entities being LTE base station entities), separate cell identifier blacklist settings (i.e. a second variant of the first blacklist information and/or a second variant of the second blacklist information) refer to the active (or connected) mode of the user equipment and in view of target 3G radio cells (i.e. the further base station entities being 3G or UMTS base station entities), separate cell identifier blacklist settings (i.e. a third variant of the first blacklist information and/or a third variant of the second blacklist information) refer to the idle mode of the user equipment (listening to the serving base station entity) and in view of target 3G radio cells (i.e. the further base station entities being 3G or UMTS base station entities).

According to the present invention, it is preferred that for each of these different variants, a different variant of the first blacklist information is used during a first step, i.e. the first blacklist information/the first/second/third variant of the first blacklist information—received by the user equipment from the serving base station entity—refers at most to other cell identifiers than the specific cell identifier of the respective concerned target radio cell (i.e. the further base station entity) according to the different situations. Likewise, it is preferred that for each of the different variants, a different variant of the second blacklist information is used during a second step, i.e. the second blacklist information/the first/second/third variant of the second blacklist information—received by the user equipment from the serving base station entity—refers at least to the specific cell identifier of the respective target cell (or of the further base station entity), and the user equipment, upon reception from the further base station entity of an identifier information comprising the specific cell identifier, avoids transmitting additional information regarding the further base station entity to the serving base station entity (in case the user equipment is in active mode) and/or avoids a consideration of the further base station entity in the cell-reselection procedure (in case the user equipment is in idle mode).

According to the present invention, the cell identifier blacklist settings for the case of the target cells being LTE radio cells (i.e. the further base station entities are LTE base station entities) refer to the physical cell identifier (of the further base station entity). According to the present invention, the cell identifier blacklist settings for the case of the target cells being 3G radio cells (i.e. the further base station entities are 3G base station entities) refer to the primary scrambling code (of the further base station entity) and/or to the primary scrambling code (of the further base station entity). In the first case (physical cell identifier as cell identifier of the further base station entity), the further base station entity is an LTE radio cell. In the second case (primary scrambling code as cell identifier of the further base station entity), the further base station entity is a 3G radio cell, especially a UMTS radio cell.

In the following, an embodiment of the inventive method is mainly described with reference to the situation of the target base station entity (or target radio cell) being a LTE radio cell (i.e. the cell identifier being the physical cell identifier) and the user equipment being in connected mode.

According to the conventional active mode Intra-LTE mobility concept according to the 3GPP standard, LTE-cells of a foreign mobile network (i.e. the further cellular telecommunications network) will be measured (by the user equipment connected to the serving base station entity) in the same way as cells of the own network (i.e. the cellular telecommunications network) by the user equipment and reported towards the serving eNodeB (i.e. the serving base station entity), if a configured threshold is or a plurality of configured thresholds are violated. According to the 3GPP standard, this refers to measuring LTE radio cells of the further cellular telecommunications network by user equipments served by the serving base station entity (of the (own) cellular telecommunications network), the serving base station being an LTE base station entity, i.e. serving an LTE radio cell. According to a different functionality, this also refers to measuring 3G radio cells (or UMTS radio cells) of the further cellular telecommunications network by user equipments served by the serving base station entity (of the (own) cellular telecommunications network), the serving base station being an LTE base station entity. In the first case (i.e. measuring (further) LTE radio cells by the user equipment served by the serving LTE radio cell), the serving base station entity (or eNodeB) receives a pair of physical cell identifier and measured field-strength (reference signals received power, RSRP) for a predefined/configured centre frequency. As long as the combination of the physical cell identifier and the frequency is not known by the serving base station entity or eNodeB within an internal database (of the serving base station entity, especially the Neighbour Cell List, NCL) and the Automatic Neighbour Relation (ANR)-function is activated, the serving base station entity or eNodeB sends to the user equipment a CGI-request (cell global identity) for this measured new (physical) cell identifier. As mentioned above, this refers to a user equipment connected to the serving base station entity, i.e. being in connected mode. In the next step, the user equipment decodes the cell global identity of the radio cell. This cell identifier includes, beside others, the Mobile Country Code (MCC) and Mobil Network Code (MNC), and reports this back to the serving base station entity or eNodeB. As long as this PLMNid (i.e. the combination of the MCC+MNC) is not allowed to be used for a handover by the serving mobile network (i.e., Inter PLMN handover is not established between the serving base station entity and the measured foreign cellular telecommunications network)—i.e. the base station entities of the further cellular telecommunications network cannot be used as handover target by the serving base station entity or eNodeB (which is often the case for active mode mobility) in the serving base station entity or eNodeB—, the reported measurements of the user equipment related to this CGI (or physical cell identifier) or to this PLMNid at all are ignored and discarded or the needed IP address resolution of the measured and reported neighboured cell (CGI of the further cellular telecommunication network) cannot be delivered via the serving Mobility Management Entity (MME) and no further action takes place. The case of a user equipment being in active mode (or connected mode) to the serving base station entity, and the target radio cell being a 3G radio cell (i.e. the further base station entity being a 3G base station entity) functions roughly analogously, however the cell identifier used for blacklisting purposes is the primary scrambling code rather than the physical cell identifier. Both for the mentioned intra-RAT (radio access technology) situation (i.e. the target radio cell being an LTE radio cell) as for the inter-RAT situation (i.e. the target radio cell being a 3G radio cell), in case that the user equipment is in idle mode requires to transmit, by the user equipment, the specific cell identifier of the target radio cell as well as the additional information related to the target radio cell to the serving base station entity; the user equipment needs to be programmed such that in order to transmit the additional information, the idle mode is shortly left and changed to the active (or connected) mode.

According to the present invention, the pieces of information of the additional information are used for an improved operation of the cellular telecommunications network in the edge region of the radio coverage area, typically along a territorial border between two countries.

According to the present invention, this is realized by—during a first step—at least partly reduce (or even completely eliminate) the application of first (physical) cell identifier blacklist (or first blacklist information/variants thereof; instructed by the serving base station entity towards the user equipment) to be applied by the user equipment, i.e. at least for some of the (physical) cell identifiers that are known (or assumed) to be in use by base station entities of the further cellular telecommunications network (i.e. the cellular telecommunications network across the border), these (physical) cell identifiers are not included in the (physical) cell identifier blacklist (first blacklist information) to be applied by the user equipment (or even the (physical) cell identifier blacklist is emptied altogether, i.e. the first blacklist information does not comprise any entries at all or a first blacklist information is not sent at all). In the context of the present invention, this also applies to the further base station entity of the further cellular telecommunications network, i.e. the specific (physical) cell identifier of that further base station entity is not included in the (physical) cell identifier blacklist (first blacklist information) to be applied by the user equipment. Alternatively to transmitting the first blacklist information from the serving base station entity to the user equipment, it is also possible (in case that the list of (physical) cell identifiers is empty) that no blacklist information is transmitted at all from the serving base station entity to the user equipment.

In essence, this means that—during the first step—
either the list of (physical) cell identifiers to be blacklisted during the first step is not completely empty (i.e. there are (physical) cell identifiers to be blacklisted) in which case the first blacklist information is transmitted to the user equipment, or the list of (physical) cell identifiers to be blacklisted during the first step is completely empty (i.e. there are no (physical) cell identifiers to be blacklisted) in which case either the first blacklist information is transmitted to the user equipment (indicating an empty list) or a first blacklist information is omitted (i.e. a blacklist indicating information is not transmitted from the serving base station entity to the user equipment) in the communication between the serving base station entity and the user equipment, indicating an empty list.

Therefore, it is possible that, during the first step, such additional information (related to the further base station entity) are transmitted, by the user equipment, to the serving base station entity (and possibly from the serving base station entity to another network node (typically a central network node) of the cellular telecommunications network). During a second step, especially in order to avoid unnecessary repetitions of such transmissions of additional information (that are then known to the serving base station entity and/or to the central network node of the cellular telecommunications network), a second blacklist information (or variants thereof) is transmitted to the user equipment, the second blacklist information comprising the specific (physical) cell identifier of the further base station entity, which results in avoiding to repeatedly transmit the additional information regarding the further base station entity.

Especially, the present invention advantageously addresses a method as well as a cellular telecommunications network and a system for an improved operation of a cellular telecommunications network in an edge region of the radio coverage area of the cellular telecommunications network. All preferred embodiments of the inventive method also apply—mutatis mutandis—to the cellular telecommunications network and to the system for an improved operation of a cellular telecommunications network according to the present invention.

There is a significant benefit of the inventive flexible detection and PCI-blacklisting method. As long as sites/cells with PCIs and other RF-related parameters will not be exchanged by neighboured operators (i.e. the operators of the cellular telecommunications network and the further cellular telecommunications network, along the territorial border), a mobile operator would forbid the complete preferred PCI-set of the neighboured operator within his cells. Even that e.g. half of the total 504 PCIs can be used within the cellular telecommunications network in the edge region of the cellular telecommunications network, the operator would lose a lot of degree of freedom, because typical only a significant smaller amount of PCIs of the foreign operator are really be measured within the coverage area of a considered cell (i.e. the radio cell of the serving base station entity). With embodiments of the invention, it is advantageously possible to limit the range of (physical) cell identifier that need to be blacklisted to only those (physical) cell identifier that are relevant (because they have really been measured, at least once). This possible restriction of the (physical) cell identifiers to be blacklisted by the serving base station entity is important because the blacklisted (physical) cell identifiers can also not be used in the surrounding radio cells of the cellular telecommunications network (i.e. the radio cells located away from the border or edge region of the cellular telecommunications network), because based on the air interface blacklisting, the mobility measurements and related procedures (e.g. event reports) related to the blacklisted (physical) cell identifiers are not released any longer by the user equipment.

According to the present invention, the serving base station entity is especially an LTE base station entity, and the further base station entity—to be detected, during the first step, by the serving base station entity by using measurements of the user equipment (connected to the serving base station entity)—is equally an LTE base station entity using a common frequency band (intra-frequency). However, also the detection of inter-frequency relations between the serving base station entity and the further base station entity, as well as inter-radio-access-technology (inter-RAT) relations between the serving base station entity and the further base station entity are addressed and explored during the first and second step (i.e. by using the variants of the first/second blacklist information).

Experience shows that the rule to exclusively use preferred (or assigned) cell identifiers (i.e. physical cell identifiers or primary scrambling codes) or sets of assigned cell identifiers (i.e. physical cell identifiers or primary scrambling codes) is sometimes violated due to several reasons. According to the present invention, it is furthermore possible to detect these violations.

According to the present invention, a telecommunications network (used in embodiments of the inventive method and comprised in embodiments of the inventive system) is a cellular telecommunications network, especially a public land mobile network, comprising a (likewise cellular) access network. At least one user equipment (but preferably a plurality and still more preferably a multitude of user equipments) is located in a radio cell of the access network of the cellular telecommunications network and is registered with the cellular telecommunications network via a serving base station entity, wherein the radio cell is served by the base station entity, or eNodeB, as the serving base station entity (or serving eNodeB) according to one or a plurality of radio access technologies, especially according to LTE (Long Term Evolution).

According to the present invention, it is preferred that the first and second steps are repeated subsequent to the second step, wherein the repetition of the first step is performed at least once during a predetermined time interval.

Thereby it is advantageously possible that the additional information related to the further base station entity is updated (during the application of the first step) and afterwards used without the need to continuously transmit the additional information related to the further base station entity and thereby increasing the signalling overhead. It is especially preferred to repeat the first step at least once every 60 minutes or at least once every 6 hours or at least once every 12 hours or at least once every 24 hours or at least one every 48 hours or at least once every 72 hours or at least once every 5 days or at least once every 7 days or at least once every 10 days or at least once every 14 days or at least once every 30 days or at least every month or at least every two months.

Furthermore, it is preferred according to the present invention that the first step is terminated and the second step conducted after a further predetermined time interval has elapsed, or after the serving base station entity having received the additional information regarding the further base station entity from the user equipment and/or from a further user equipment served by the serving base station entity a predetermined number of times or at a predetermined repetition rate during a further predetermined time interval.

Thereby, it is advantageously possible according to the present invention to flexibly adapt the exchange between the first step and the second step according to the present invention.

Still furthermore, it is preferred according to the present invention that a set of preferred cell identifiers (i.e. physical cell identifiers or primary scrambling codes) is assigned to the further cellular telecommunications network, wherein the second blacklist information comprises only a real subset of the set of preferred cell identifiers (i.e. physical cell identifiers or primary scrambling codes) assigned to the further cellular telecommunications network.

Thereby, it is advantageously possible according to the present invention, that there is no need to blacklist each and every cell identifier (i.e. physical cell identifier or primary scrambling code) that is assigned to the further cellular telecommunications network. Instead, it is possible to reuse at least part of the (physical) cell identifiers (assigned to the further cellular telecommunications network) also for the cellular telecommunications network, resulting in more flexibility regarding network planning options within the cellular telecommunications network.

Furthermore, it is preferred according to the present invention that, during the first step, the user equipment is in active mode, wherein during a third step, subsequent to the first step, the second blacklist information—received by the user equipment—refers to the idle mode of the user equipment and at least to the specific cell identifier, and the user equipment, upon reception from the further base station entity of an identifier information comprising the specific cell identifier, avoids transmitting additional information regarding the further base station entity to the serving base station entity and/or avoids a consideration of the further base station entity in the cell-reselection procedure.

Thereby, it is advantageously possible to use the blacklist information obtained during the first step—while the user equipment was in an active mode—also in a (subsequent) situation where the user equipment is in idle mode.

Furthermore, it is preferred according to the present invention that the additional information regarding the further base station entity that are transmitted by the user equipment to the serving base station entity comprises the following data:
- a cell global identifier of the further base station entity comprising a mobile country code information, a mobile network code information, location area code and cell identifier,
- the specific cell identifier (i.e. physical cell identifier or primary scrambling code) of the further base station entity,
- a first reference signals received power information and a first reference signals received quality information regarding the serving base station entity,
- a second reference signals received power information and a second reference signals received quality information regarding the further base station entity, and
- a time stamp information of the measurement.

Furthermore, it is also preferred according to the present invention that the additional information regarding the further base station entity that are transmitted by the user equipment to the serving base station entity furthermore comprises at least one out of the following data:
- a first timing advance information regarding radio signals transmitted between the user equipment and the serving base station entity and/or a second timing advance information regarding radio signals transmitted between the user equipment and the further base station entity,
- further reference signals received power information and further reference signals received quality information regarding additional neighbour cells—besides the serving base station entity and the further base station entity—of the user equipment,
- a field-strength information of inter frequency neighbour cells,
- a field-strength information of inter radio access technology neighbour cells,
- a geo-reference information as part of minimization of drive tests information, especially comprising a location information referring to a global navigation satellite system and/or a WLAN fingerprint information.

Thereby, it is advantageously possible to also indicate the geographical position of the user equipment, i.e. a geo-reference information related to the user equipment, at the time of the measurement. This serves to localize the user equipment, i.e. to determine the location of the user equipment, as precisely as possible, especially in order to answer the question where the user equipment is located (at the time of the measurement) with respect to the territorial border (i.e. is it located on the side of the cellular telecommunications network (i.e. the own public land mobile network), or on the side of the further cellular telecommunications network, or is it located more than x kilometers from the territorial border and in which direction). The localization of the user equipment can be done by different mechanisms, e.g. by using functionality (of the user equipment and the serving base station entity) used in the framework of the minimization of drive tests (MDT), or by using other techniques. Especially in case the user equipment has an activated MDT functionality enabled, a direct indication of the geographical position information can be transmitted as part of the additional information regarding the further base station entity. However, even in case that such a direct geographical position information cannot be obtained (e.g. due to a lack of permissions to perform localization measurements and transmit corresponding results or due to a lack of GNSS (Global Navigational Satellite System) coverage of the user equipment) fingerprint information regarding reference signals received power regarding additional neighbour cells—besides the serving base station entity and the further base station entity—of the user equipment can be indicative of the current position of the user equipment. Another alternative is to use the geo-localization of user equipments according to 3GPP Release 9 listed in 3GPP TS 36.305.

Furthermore, it is preferred according to the present invention that, based on the additional information regarding the further base station entity that are transmitted to the serving base station entity by the user equipment and/or by a further user equipment served by the serving base station entity,
- a data base is maintained comprising the additional information regarding the further base station entity transmitted to the serving base station entity, and/or
- a detection of violations is performed of the exclusive use of the set of preferred cell identifiers (i.e. physical cell identifiers or primary scrambling codes) assigned to the further cellular telecommunications network, and/or
- a detection of violations is performed of agreed field strength values in the edge region of the radio coverage areas of the cellular telecommunications network and the further cellular telecommunications network, and/or
- a field strength array is determined of the edge region of the radio coverage areas of the cellular telecommunications network and the further cellular telecommunications network.

These uses of the additional information regarding the further base station entity—according to the present invention—can be particularly facilitated by storing, e.g. in a log-file, and for the opportunity of a further post-processing the following pieces of information of the additional information in a memory device, typically located in a central node of the cellular telecommunications network:
- the source cell identifier, e.g. Source CGI (i.e. the CGI of the serving base station entity),
- the target cell identifier including PLMNid, e.g. Target CGI (i.e. the CGI of the further base station entity),
- the physical cell identifier of the source cell (i.e. of the serving base station entity),
- the cell identifier (i.e. physical cell identifier or primary scrambling code) of the measured Target cell (i.e. of the further base station entity), the source cell RSRP, RSRQ, i.e. the reference signals received power and reference signals received quality of the serving base station entity, the target cell RSRP, RSRQ, i.e. the reference signals received power and reference signals received quality of the further base station entity, a time stamp of the measurement.

These a.m. uses of the additional information regarding the further base station entity—according to the present invention—can still more facilitated by storing, e.g. in a log-file, and for the opportunity of a further post-processing the following pieces of information of the additional information in the memory device, wherein these pieces of information are aimed for providing an estimate or a direct measure of the position of the user equipment (at the time of the measurement):

the timing Advance (TA), the Report Strongest Cells Report (RSRP, RSRQ of up to 8 neighbour cells per centre frequency, field-strengths of InterRAT neighbour cells), the GPS (or other GNSS) position information, if MDT is activated and supported by the terminal and allowed by the user profile.

Several operation modes for the data-analysis are possible according to the present invention. First, directly at the serving base station entity (or eNodeB) itself or in a central unit, e.g. network management system. There are different options available how to proceed:

The measured cell identifiers (i.e. physical cell identifiers or primary scrambling codes) of the foreign mobile network operator shall be directly transferred into the cell identifier air interface blacklist to avoid further measurements/reports of the user equipment for these cell identifiers (i.e. the second step is invoked after the first occurrence of a detection of the specific cell identifier (i.e. physical cell identifier or primary scrambling code) of the further base station entity).

A kind of tracking mode (i.e. the application of the first step) has to run over a configured time frame, e.g. one week; after the configured time frame the stored information shall be analysed. If the amount of measurements per cell identifier reaches a configured threshold, these measured cell identifiers (i.e. physical cell identifiers or primary scrambling codes) shall be configured as blacklisted cell identifiers (air interface blacklisting according to 3GPP) within the serving cell to avoid further measurements/reports from these "foreign cell identifiers" by the serving user equipments, hence the second step is invoked.

With the collected time stamp of the measurements, it is possible to correlate the measured interference with other operational events, like temporary site/cell outages and a resulting loss of own coverage in the affected borderline area. In such cases a filter can be used to remove such "abnormal" measurements and to avoid unnecessary cell identifier (i.e. physical cell identifiers or primary scrambling codes) blacklistings.

Furthermore, it is preferred according to the present invention that the edge region of the radio coverage area of the cellular telecommunications network is located in the vicinity of a territorial border, wherein the further cellular telecommunications network also located in the vicinity of the territorial border, wherein the serving base station entity is located on a first side of the territorial border, and wherein the further base station entity is located on a second side of the territorial border, the second side being opposite of the first side with respect to the territorial border.

The present invention also relates to a cellular telecommunications network, especially public land mobile network, provided for an improved operation in an edge region of the radio coverage area of the cellular telecommunications network, wherein the cellular telecommunications network comprises an access network, wherein a user equipment is located in a radio cell of the access network, the radio cell being located in the edge region of the radio coverage area of the cellular telecommunications network and the radio cell being served by a serving base station entity, wherein the user equipment—besides receiving radio signals from the serving base station entity—is configured to receive radio signals also from a further base station entity of a further cellular telecommunications network, wherein a specific cell identifier, especially a specific physical cell identifier and/or a specific primary scrambling code, is assigned to the further base station entity, wherein the serving base station entity is configured to transmit a blacklist information regarding cell identifiers to the user equipment, the blacklist information referring to cell identifiers for which measurements—to be conducted by the user equipment—of the radio environment at the position of the user equipment are to be avoided, wherein the cellular telecommunications network is configured such that a first blacklist information—sent by the serving base station entity to the user equipment—refers at most to other cell identifiers than the specific cell identifier, especially at most to other physical cell identifiers than the specific physical cell identifier or at most to other primary scrambling codes than the specific primary scrambling code, or a blacklist indicating information is omitted from the base station entity, and the user equipment is configured to receive—from the further base station entity—an information comprising the specific cell identifier, especially the specific physical cell identifier or the specific primary scrambling code, wherein the specific cell identifier, especially the specific physical cell identifier or the specific primary scrambling code, as well as additional information related to the further base station entity are transmitted by the user equipment to the serving base station entity, and a second blacklist information—sent by the serving base station entity to the user equipment—refers at least to the specific cell identifier, especially the specific physical cell identifier or the specific primary scrambling code, and the user equipment is configured such that, upon reception from the further base station entity of an identifier information comprising the specific cell identifier, especially the specific physical cell identifier or specific primary scrambling code, avoids transmitting additional information regarding the further base station entity to the serving base station entity and/or avoids a consideration of the further base station entity in the cell-reselection procedure.

According to a further embodiment of the present invention, it is preferred that the additional information regarding the further base station entity that are transmitted by the user equipment to the serving base station entity comprises the following data:

a cell global identifier of the further base station entity comprising a mobile country code information, a mobile network code information, location area code and cell identifier, the specific cell identifier, especially the specific physical cell identifier or specific primary scrambling code, of the further base station entity, a first reference signals received power information and a first reference signals received quality information regarding the serving base station entity, a second reference signals received power information and a second reference signals received quality information regarding the further base station entity, and a time stamp information of the measurement.

Furthermore, it is preferred according to the present invention that the additional information regarding the further base station entity that are transmitted by the user equipment to the serving base station entity furthermore comprises at least one out of the following data:

a first timing advance information regarding radio signals transmitted between the user equipment and the serving base station entity and/or a second timing advance information regarding radio signals transmitted between the user equipment and the further base station entity, further reference signals received power information and further reference signals received quality information regarding additional neighbour cells—besides the serving base station entity and the further base station entity—of the user equipment, a field-strength information of inter frequency neighbour cells, a field-strength information of inter radio access technology neighbour cells, a geo-reference information as part of minimization of drive tests information, especially comprising a location information referring to a global navigation satellite system and/or a WLAN fingerprint information.

The present invention also relates to a system for an improved operation in an edge region of the radio coverage area of the cellular telecommunications network, wherein the system comprises the cellular telecommunications network and a user equipment, wherein the cellular telecommunications network comprises an access network, wherein the user equipment is located in a radio cell of the access network, the radio cell being located in the edge region of the radio coverage area of the cellular telecommunications network and the radio cell being served by a serving base station entity, wherein the user equipment—besides receiving radio signals from the serving base station entity—is configured to receive radio signals also from a further base station entity of a further cellular telecommunications network, wherein a specific cell identifier, especially a specific physical cell identifier and/or a specific primary scrambling code, is assigned to the further base station entity, wherein the serving base station entity is configured to transmit a blacklist information regarding cell identifiers to the user equipment, the blacklist information referring to cell identifiers for which measurements—to be conducted by the user equipment—of the radio environment at the position of the user equipment are to be avoided, wherein the cellular telecommunications network is configured such that a first blacklist information—sent by the serving base station entity to the user equipment—refers at most to other cell identifiers than the specific cell identifier, especially at most to other physical cell identifiers than the specific physical cell identifier or at most to other primary scrambling codes than the specific primary scrambling code, or a blacklist indicating information is omitted from the base station entity (i.e. is not sent by the serving base station entity to the user equipment), and the user equipment is configured to receive—from the further base station entity—an information comprising the specific cell identifier, especially the specific physical cell identifier or the specific primary scrambling code, wherein the specific cell identifier, especially the specific physical cell identifier or the specific primary scrambling code, as well as additional information related to the further base station entity are transmitted by the user equipment to the serving base station entity, and a second blacklist information—sent by the serving base station entity to the user equipment—refers at least to the specific cell identifier, especially the specific physical cell identifier or the specific primary scrambling code, and the user equipment is configured such that, upon reception from the further base station entity of an identifier information comprising the specific cell identifier, especially the specific physical cell identifier or the specific primary scrambling code, avoids transmitting additional information regarding the further base station entity to the serving base station entity and/or avoids a consideration of the further base station entity in the cell-reselection procedure.

Furthermore, the present invention relates to a program comprising a computer readable program code which, when executed on a computer or on a network node of a cellular telecommunications network, especially a serving base station entity, causes the computer or the network node of the cellular telecommunications network to perform embodiments of the inventive method.

The present invention also relates to computer program product for using a core network of a telecommunications network, the computer program product comprising a computer program stored on a storage medium, the computer program comprising program code which, when executed on a computer or on a network node of a cellular telecommunications network, especially a serving base station entity, causes the computer or the network node of the cellular telecommunications network to perform embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Figure 1:
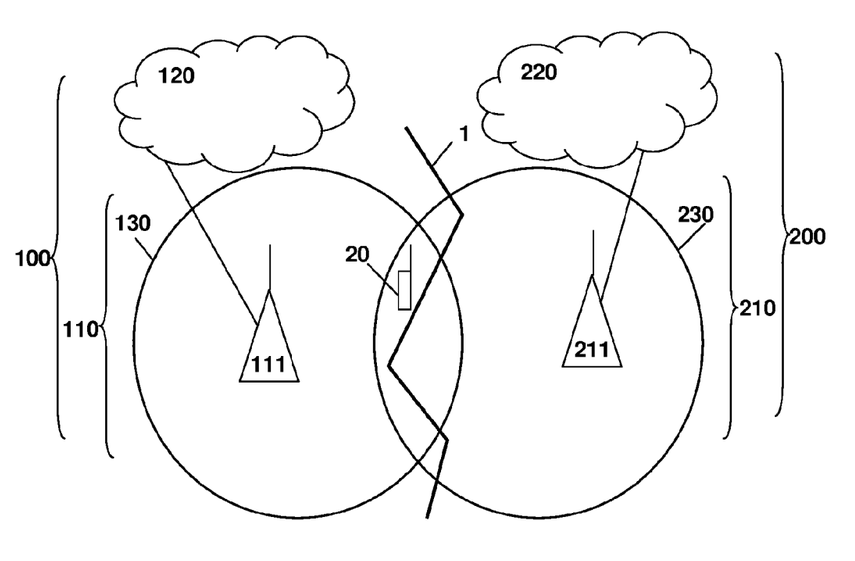
FIG. 1 schematically illustrates a cellular telecommunications network and a further cellular telecommunications network that are adjacent in an edge region along a territorial border.

In FIG. 1, a cellular telecommunications network 100 and a further cellular telecommunications network 200 are schematically shown. Both the cellular telecommunications network 100 and the further cellular telecommunications network 200 comprise an edge region (typically along a territorial border 1), where radio cells 130, 230 of the cellular telecommunications network 100 and the further cellular telecommunications network 200 overlap. A user equipment 20 which is positioned in the overlapping zone of both radio cells 130, 230 might experience an interference situation, especially in case that there is an overlap in frequency bandwidth used for communication within the radio cells 130, 230. The cellular telecommunications network 100 comprises an access network 110 and a core network 120. The cellular telecommunications network 100 is preferably a cellular telecommunications network comprising typically a plurality of network cells, one of which is represented in FIG. 1 by means of a solid circular line having reference sign 130. The further cellular telecommunications network 200 comprises an access network 210 and a core network 220. The further cellular telecommunications network 200 is preferably a cellular telecommunications network comprising typically a plurality of network cells, one of which is represented in FIG. 1 by means of a solid circular line having reference sign 230. In the cellular telecommunications network 100, typically a plurality of user equipments 20 are camping on the cellular telecommunications network 100 within the network cell 130, i.e. the user equipments 20 are connected or are camping on a serving base station entity 111 of the radio the cell 130. The serving base station entity 111 or base station entity 111 is typically an eNodeB base transceiver station for LTE.

In case that the user equipment 20 (located in the edge area of the cellular telecommunications network 100) detects the further base station entity 211 (i.e. a foreign CGI), and if MDT or periodic RSC measurements are not already running, e.g. permanent or already triggered by another event, the measured foreign CGI shall be used as new trigger condition in the serving base station entity (or serving eNodeB) to initiate intra-frequency and/or inter-frequency and/or interRAT RSC-reports RSC-report(s) for this user equipment 20. Ideally, together with the timing advance information, the position of the user equipment 20 can be estimated. If supported and allowed from the subscriber profile, user equipment and mobile network, the upper mentioned criterion shall be used to trigger a new MDT-measurement job (with a GNSS based position, like GPS-coordinates) to initiate through this user equipment the delivery of the GPS-coordinates.

Based on the geo-location, it has to be analysed if the user equipment 20 was inside or outside of the area of the cellular telecommunications network 100 and which distances exist in relation to the defined zero and agreed x kilometer inland borderlines. Next to the geographical filtering the measured field-strength can be compared with the agreed thresholds, which define the rule if a cell identifier from the preferred or complete range has to be used. In case of a violation of the preferred PCI-range set (or primary scrambling code set), an interface towards the PCI (or primary scrambling code) planning tool landscape of the foreign network operator (i.e. of the further cellular telecommunications network 200) can be used to trigger a cell identifier re-allocation of the measured cell(s) with the non-compliant use of cell identifier(s).

Beside the detection of cell identifier, especially the specific physical cell identifier or the specific primary scrambling code, preferred set violations, these geo-referenced measurements can also be used to adapt or modify the LTE coverage of the further cellular telecommunications network 200 in the region of the territorial border. These measurements can also be used to create positive and negative cell lists, which describe the real measured interference situation in the neighboured networks. Positive radio cells comprise the situation where the interference is confirmed by real user equipment measurements and negative radio cells correspond to the opposite. To achieve the negative list, the operators should exchange their LTE cell information (co-ordinates, identifiers as CGI, antenna parameters, power settings and configured centre frequency as well as PCI per LTE cell deployed in the border area) via a defined interface between each other. Based on the total cell list and the measured positive list, the negative cell list can be defined (including not measured cells and cells with measured field-strength below the defined co-ordination thresholds). The output can be used within further network optimization steps.

Based on the geo-located received RSRP values per interfering (positive) cell in comparison to the agreed co-ordination thresholds, the transmission power or the antenna parameters (as e.g. electrical tilt) of the interfering cells can be reduced/modified (if the degree of freedom to enhance the PCI range of this cell is needed in the mobile network).

If the received measurements of a foreign cell strongly violate defined thresholds, also automatic power reductions can be triggered by the interfered mobile network operator via an electronic interface towards the other operator.

The negative list can be used to enhance the possible cell identifier range as well if the preferred physical cell identifier set is considered e.g. based on former predicted results, but the main advantage is the gained freedom to enhance the coverage related parameters of these cells and to improve the coverage situation within the border area without risking an important increase in interference effects within the further cellular telecommunications network.

According to the present invention, it is not mandatory that the neighboured mobile network operators use the same LTE centre frequencies and to measure the other cells in the intra-frequency case. Also inter-frequency measurements with the used centre frequency of the other operator(s) can be configured. This makes sense if the assigned frequency spectrum of the operators is e.g. partly overlapping.

As long as the PCI's of the foreign measured cells are not "air interface" blacklisted in a serving base station entity 111 of the cellular telecommunications network 100 and RSC measurements received (via periodic measurements or initiated by individual trigger conditions, as e.g. call setup, termination, handover, event A2, changes in the state model etc. within the context of ANR or MDT), these RSC reports send by the user equipment 20 towards the serving cell can be logged and further analysed. If a cell identifier, especially the specific physical cell identifier, of the further cellular telecommunications network is included (based on a comparison with the former received CGI) within such a RSC report and this report can be geo-located, a field strength array for this geo-location or aggregated for a geographical grid-element (e.g. 100×100 m) can be generated. The knowledge about the field-strength ratios from the received cells from the cellular telecommunications network and the further cellular telecommunications network at this grid-element can be used to define—per received cell of the further cellular telecommunications network 200—how strong their impact on the SNIR of the intended serving cell(s) of the cellular telecommunications network 100 is. If acceptable thresholds are defined between the operators and based on the fact that the received RSC-measurements at a grid-element describe also a traffic weight of a grid element, a kind of traffic weighted field strength matrix can be exchanged between the mobile network operators and imported into Automatic Cell Planning (ACP) or classical radio network planning tools to consider this information within the re-planning process of the antenna or Tx-Power settings of interfering cell of the further cellular telecommunications network 200. Of course the same information can also be imported into the tool suite of the further cellular telecommunications network 200 to check if the receiving power level of its own cells can be increased as long as he do not interfere the cells of the cellular telecommunications network 100 on the other side of the border above the defined and agreed thresholds.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operation of a cellular telecommunications network in an edge region of the radio coverage area of the cellular telecommunications network, wherein the cellular telecommunications network comprises an access network, wherein a user equipment is located in a radio cell of the access network, the radio cell being located in the edge region of the radio coverage area of the cellular telecommunications network and the radio cell being served by a serving base station entity, wherein the user equipment receives radio signals from the serving base station entity and a further base station entity of a further cellular telecommunications network, wherein a specific cell identifier is assigned to the further base station entity, wherein the serving base station entity transmits blacklist information regarding cell identifiers to the user equipment, the blacklist information referring to cell identifiers for which measurements to be conducted by the user equipment of the radio environment at the position of the user equipment are to be avoided, wherein the method comprises the following steps:

in a first step, the user equipment receives, from the further base station entity, information comprising the specific cell identifier, wherein the specific cell identifier as well as additional information related to the further base station entity are transmitted by the user equipment to the serving base station entity and in a second step, subsequent to the first step, the user equipment, upon reception from the further base station entity of identifier information comprising the specific cell identifier, and based on blacklist information received by the user equipment referring at least to the specific cell identifier, avoids transmitting further additional information regarding the further base station entity to the serving base station entity and/or avoids consideration of the further base station entity in a cell-reselection procedure;

wherein the additional information related to the further base station entity transmitted by the user equipment to the serving base station entity comprises at least one out of the following data:

first timing advance information regarding radio signals transmitted between the user equipment and the serving base station entity and/or second timing advance information regarding radio signals transmitted between the user equipment and the further base station entity;

reference signals received power (RSRP) information and reference signals received quality (RSRQ) information regarding additional neighbour cells besides the serving base station entity and the further base station entity of the user equipment;

field-strength information of inter frequency neighbour cells;

field-strength information of inter radio access technology neighbour cells;

geo-reference information.

2. The method according to claim 1, wherein the first and second steps are repeated subsequent to the second step, wherein the repetition of the first step is performed at least once during a predetermined time interval.

3. The method according to claim 1, wherein after the first step is terminated, the second step is conducted
after a further predetermined time interval has elapsed or
after the serving base station entity having received the additional information regarding the further base station entity from the user equipment and/or from a further user equipment served by the serving base station entity a predetermined number of times or at a predetermined repetition rate during a further predetermined time interval.

4. The method according to claim 1, wherein a set of preferred cell identifiers is assigned to the further cellular telecommunications network, wherein the blacklist information received by the user equipment comprises a real subset of the set of preferred cell identifiers assigned to the further cellular telecommunications network.

5. The method according to claim 1, wherein, during the first step, the user equipment is in active mode, and wherein the blacklist information received by the user equipment further refers to the idle mode of the user equipment.

6. The method according to claim 1, wherein the additional information regarding the further base station entity transmitted by the user equipment to the serving base station entity comprises the following data:
a cell global identifier of the further base station entity comprising a mobile country code information, a mobile network code information, location area code and the cell identifier, the specific cell identifier of the further base station entity,
first reference signals received power information and a first reference signals received quality information regarding the serving base station entity,
second reference signals received power information and a second reference signals received quality information regarding the further base station entity, and
a time stamp information of the measurement.

7. The method according to claim 1, wherein the edge region of the radio coverage area of the cellular telecommunications network is located in the vicinity of a territorial border, wherein the further cellular telecommunications network is also located in the vicinity of the territorial border, wherein the serving base station entity is located on a first side of the territorial border, and wherein the further base station entity is located on a second side of the territorial border.

8. The method according to claim 1, wherein, based on the additional information regarding the further base station entity transmitted to the serving base station entity by the user equipment and/or based on additional information regarding the further base station entity transmitted by a further user equipment served by the serving base station entity,
a data base is maintained comprising the additional information regarding the further base station entity transmitted to the serving base station entity, and/or
a detection of violations is performed of the exclusive use of the set of preferred cell identifiers assigned to the further cellular telecommunications network, and/or
a detection of violations is performed of agreed field strength values in the edge region of the radio coverage areas of the cellular telecommunications network and the further cellular telecommunications network, and/or
a field strength array is determined of the edge region of the radio coverage areas of the cellular telecommunications network and the further cellular telecommunications network.

9. A cellular telecommunications network configured for operation in an edge region of the radio coverage area of the cellular telecommunications network, wherein the cellular telecommunications network comprises:
an access network, wherein a user equipment is located in a radio cell of the access network, the radio cell being located in the edge region of the radio coverage area of the cellular telecommunications network and the radio cell being served by a serving base station entity, wherein the user equipment is configured to receive radio signals from the serving base station and from a further base station entity of a further cellular telecommunications network, wherein a specific cell identifier is assigned to the further base station entity, wherein the serving base station entity is configured to transmit blacklist information regarding cell identifiers to the user equipment, the blacklist information referring to cell identifiers for which measurements to be conducted by the user equipment of the radio environment at the position of the user equipment are to be avoided;
wherein the user equipment is configured to receive, from the further base station entity, information comprising the specific cell identifier, and to transmit the specific cell identifier as well as additional information related to the further base station entity to the serving base station entity; and
wherein the user equipment is configured such that, upon reception from the further base station entity of identifier information comprising the specific cell identifier, and based on blacklist information sent by the serving base station entity to the user equipment referring at least to the specific cell identifier, the user equipment avoids transmitting further additional information regarding the further base station entity to the serving base station entity and/or avoids consideration of the further base station entity in the cell-reselection procedure;
wherein the additional information related to the further base station entity comprises at least one out of the following data:
first timing advance information regarding radio signals transmitted between the user equipment and the serving base station entity and/or second timing advance information regarding radio signals transmitted between the user equipment and the further base station entity;
reference signals received power (RSRP) information and reference signals received quality (RSRQ) information regarding additional neighbour cells besides the serving base station entity and the further base station entity of the user equipment;
field-strength information of inter frequency neighbour cells;
field-strength information of inter radio access technology neighbour cells;
geo-reference information.

10. The cellular telecommunications network according to claim 9, wherein the additional information regarding the further base station entity transmitted by the user equipment to the serving base station entity comprises the following data:
a cell global identifier of the further base station entity comprising a mobile country code information, a mobile network code information, location area code and cell identifier,
the specific cell identifier of the further base station entity,
first reference signals received power information and first reference signals received quality information regarding the serving base station entity,
second reference signals received power information and second reference signals received quality information regarding the further base station entity, and
time stamp information of the measurement.

11. A system for operation of a cellular telecommunications network in an edge region of the radio coverage area of the cellular telecommunications network, wherein the system comprises:
the cellular telecommunications network; and
a user equipment;
wherein the cellular telecommunications network comprises an access network,
wherein the user equipment is located in a radio cell of the access network, the radio cell being located in the edge region of the radio coverage area of the cellular telecommunications network and the radio cell being served by a serving base station entity;
wherein the user equipment is configured to receive radio signals from the serving base station entity and from a further base station entity of a further cellular telecommunications network;
wherein a specific cell identifier is assigned to the further base station entity;
wherein the serving base station entity is configured to transmit blacklist information regarding cell identifiers to the user equipment, the blacklist information referring to cell identifiers for which measurements to be conducted by the user equipment of the radio environment at the position of the user equipment are to be avoided;

wherein the user equipment is configured to receive, from the further base station entity, information comprising the specific cell identifier, and to transmit the specific cell identifier as well as additional information related to the further base station entity to the serving base station entity; and wherein the user equipment is configured such that, upon reception from the further base station entity of an identifier information comprising the specific cell identifier, and based on blacklist information sent by the serving base station entity to the user equipment referring at least to the specific cell identifier, the user equipment avoids transmitting further additional information regarding the further base station entity to the serving base station entity and/or avoids consideration of the further base station entity in a cell-reselection procedure;

wherein the additional information related to the further base station entity comprises at least one out of the following data:

first timing advance information regarding radio signals transmitted between the user equipment and the serving base station entity and/or second timing advance information regarding radio signals transmitted between the user equipment and the further base station entity;

reference signals received power (RSRP) information and reference signals received quality (RSRQ) information regarding additional neighbour cells besides the serving base station entity and the further base station entity of the user equipment;

field-strength information of inter frequency neighbour cells;

field-strength information of inter radio access technology neighbour cells;

geo-reference information.

12. A non-transitory, computer program product comprising a computer program stored on a storage medium having processor-executable instructions stored thereon for operation of a cellular telecommunications network in an edge region of the radio coverage area of the cellular telecommunications network, wherein the cellular telecommunications network comprises an access network, wherein a user equipment is located in a radio cell of the access network, the radio cell being located in the edge region of the radio coverage area of the cellular telecommunications network and the radio cell being served by a serving base station entity, wherein the user equipment is configured to receive radio signals from the serving base station entity and a further base station entity of a further cellular telecommunications network, wherein a specific cell identifier is assigned to the further base station entity, wherein the serving base station entity is configured to transmit blacklist information regarding cell identifiers to the user equipment, the blacklist information referring to cell identifiers for which measurements to be conducted by the user equipment of the radio environment at the position of the user equipment are to be avoided, wherein the processor-executable instructions, when executed, facilitates performance of the following:

in a first step, the user equipment receives, from the further base station entity, information comprising the specific cell identifier, wherein the specific cell identifier as well as additional information related to the further base station entity are transmitted by the user equipment to the serving base station entity; and in a second step, subsequent to the first step, the user equipment, upon reception from the further base station entity of identifier information comprising the specific cell identifier, and based on blacklist information received by the user equipment referring at least to the specific cell identifier, avoids transmitting further additional information regarding the further base station entity to the serving base station entity and/or avoids consideration of the further base station entity in a cell-reselection procedure;

wherein the additional information related to the further base station entity transmitted by the user equipment to the serving base station entity comprises at least one out of the following data:

first timing advance information regarding radio signals transmitted between the user equipment and the serving base station entity and/or second timing advance information regarding radio signals transmitted between the user equipment and the further base station entity;

reference signals received power (RSRP) information and reference signals received quality (RSRQ) information regarding additional neighbour cells besides the serving base station entity and the further base station entity of the user equipment;

field-strength information of inter frequency neighbour cells;

field-strength information of inter radio access technology neighbour cells;

geo-reference information.

* * * * *